US006366116B1

(12) United States Patent
Juang

(10) Patent No.: US 6,366,116 B1
(45) Date of Patent: Apr. 2, 2002

(54) PROGRAMMABLE DRIVING CIRCUIT

(75) Inventor: Dar-Chang Juang, Hsinchu (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 0 days.

(21) Appl. No.: 09/761,684

(22) Filed: Jan. 18, 2001

(51) Int. Cl.[7] .................................................. G06F 7/38

(52) U.S. Cl. .......................... 326/37; 326/113; 326/112

(58) Field of Search .............................. 326/37, 38, 47, 326/112, 113, 119, 121

(56) References Cited

U.S. PATENT DOCUMENTS 5,808,483 A * 9/1998 Sako .......................... 326/113
6,084,437 A * 7/2000 Sako .......................... 326/113

* cited by examiner

*Primary Examiner*—Michael Tokar
*Assistant Examiner*—Anh Q. Tran
(74) *Attorney, Agent, or Firm*—Bacon & Thomas, PLLC

(57) ABSTRACT

There is disclosed a programmable driving circuit for being applied in an organic light emitting diode display panel. The driving circuit has a plurality of driver cells, each comprising a switch transistor, a current output transistor, a discharge transistor, and a plurality of multiplexers each for selecting the row driving inputs, column driving inputs, and required bias outputs. By controlling the control terminals of the multiplexers for performing switching controls, the driving circuit is programmed.

12 Claims, 7 Drawing Sheets

PROGRAMMABLE DRIVING CIRCUIT

BACKGROUND OF THE INVENTION

1. Field of the Invention

The present invention relates to a driving circuit and, more particularly, to a programmable driving circuit for being applied in an organic light emitting diode (OLED) panel.

2. Description of Related Art

Conventionally, organic light emitting diode (OLED) panel is composed of a plurality of thin-film organic light emitting diodes. The driving mode of the OLED panel may be a constant current driving or a constant voltage driving mode. FIGS. 5 and 6 illustrate the system architectures of OLED panels driven by a constant voltage driving circuit and by a constant current driving circuit, respectively. Typically, the OLED panel is of a common cathode configuration. Therefore, the driving circuit is divided into a column driving circuit 51 or 61 and a row driving circuit 52, wherein the column driving circuit 51 or 61 is provided to output current to anodes of OLEDs 54 of a corresponding column in response to input column data from a column data shift register 53. Furthermore, the row driving circuit 52 is provided to sink the conducting current of a row of the common-cathode OLEDs 54 turned on by scanning line pulse of a row scanning shift register 55.

In design an OLED driving system, the column driving circuit 61 of the constant current driving circuit generally comprises a plurality of constant current column driver cells 71, as shown in FIG. 7, and a reference bias generator 62. The column driving circuit 51 of the constant voltage driving circuit is generally implemented by a plurality of constant voltage column driver cells 81, as shown in FIG. 8. The output current of each of the column driver cells 71 and 81 is controlled by input column driving signal of a column data shift register 53. In order to rapidly eliminate the residual image caused by the junction capacitance and the wiring stray capacitance of the OLEDs 54, a discharge device MND controlled by discharge signal DIS is provided in the column driver cells 71 and 81 of the column driving circuit 51 and 61, respectively. The discharge device MND is conducted for a short period of time at the beginning or end of each scanning line for leaking off the charge stored in the junction capacitors and the stray capacitors of OLEDs. Moreover, a pre-charge device NPPRE is usually provided in the constant current column driver cell 71. The pre-charge device MPPRE is controlled by a pre-charge control terminal PRE-CHARGE for pre-charging OLEDs to be turned on.

The row driving circuit 52 is composed of a plurality of row driver cells 521, each being an inverter or an amplifier capable of sinking a large current, so as to sink the conducting current from a whole row of OLEDs at a row input terminal ROWI and maintain a relatively low voltage drop (e.g., smaller than IV).

Because the requirements of the characteristics of the column driving circuit and row driving circuit are different, the system design of the OLED panel usually employs a column driving integrated circuit (IC) and a row driving IC that are separately designed and manufactured. However, to satisfy various requirements in different applications, there is required a variety of combinations of pixels for the OLED panel, such as 64 column×16 row, 48 column×32 row, 32 column×48 row, 16 column×64 row, or an even a larger one. Thus, a plurality of different column driving ICs and a plurality of different row driving ICs must be developed for fulfilling such needs, resulting in increasing the manufacturing cost and wasting the resource. Therefore, it is desirable for the above conventional OLED driving circuit to be improved.

SUMMARY OF THE INVENTION

An object of the present invention is to provide a programmable driving circuit which can be programmed to provide a desired number of column driver cells and row driver cells based on the combination of pixels of OLED panel, thus eliminating the need to design and manufacture various column driving ICs and row driving ICs as experienced by the prior art.

According to one aspect, the present invention which achieves the object relates to a programmable driving circuit having a plurality of driver cells, each comprising: a switch transistor having a source connected to a supplied voltage; a current output transistor having a source connected to a drain of the switch transistor, and a drain provided as a column/row output terminal of the driver cell; a discharge transistor having a drain connected to the drain of the current output transistor, and a source connected to ground; a first multiplexer having an output terminal connected to the gate of the switch transistor, a first input terminal and a second input terminal provided as a row input terminal and a column input terminal of the driver cell, respectively; a second multiplexer having an output terminal connected to the gate of the discharge transistor, a first input terminal connected to the row input terminal, and a second input terminal provided as a discharge control terminal; and a third multiplexer having an output terminal connected to the gate of the current output transistor, a first input terminal connected to ground, and a second input terminal connected to a bias output terminal, wherein each of the first, the second, and the third multiplexers has a control terminal connected together for being provided as a programmable control terminal.

According to another aspect, the present invention which achieves the object relates to a programmable driving circuit having a plurality of driver cells, each comprising: a switch transistor having a source connected to a supplied voltage; a current output transistor having a source connected to a drain of the switch transistor, and a drain provided as a column/row output terminal of the driver cell; a discharge transistor having a drain connected to the drain of the current output transistor, and a source connected to ground; a pre-charge transistor having a source and a drain connected to the source and the drain of the current output transistor, respectively; a first multiplexer having an output terminal connected to a gate of the switch transistor, a first input terminal and a second input terminal provided as a row input terminal and a column input terminal of the driver cell, respectively; a second multiplexer having an output terminal connected to a gate of the discharge transistor, a first input terminal connected to the row input terminal, and a second input terminal provided as a discharge control terminal; a third multiplexer having an output terminal connected to a gate of the current output transistor, a first input terminal connected to ground, and a second input terminal connected to a bias output terminal; and a fourth multiplexer having an output terminal connected to a gate of the pre-charge transistor, a first input terminal connected to the supplied voltage, and a second input terminal provided as a discharge control terminal, wherein each of the first, the second, the third, and the fourth multiplexers has a control terminal connected together for being provided as a programmable control terminal.

According to yet another aspect, the present invention which achieves the object relates to a programmable driving circuit having a plurality of driver cells, each comprising: a switch transistor having a source connected to a supplied voltage; a current output transistor having a source connected to a drain of the switch transistor, and a drain provided as a column/row output terminal of the driver cell; a discharge transistor having a drain connected to the drain of the current output transistor and a source connected to ground; an auto-clamped pre-charge transistor having a source and a drain connected to the source and the drain of the current output transistor, respectively; a first multiplexer having an output terminal connected to a gate of the switch transistor, a first input terminal and a second input terminal provided as a row input terminal and a column input terminal of the driver cell, respectively; a second multiplexer having an output terminal connected to a gate of the discharge transistor, a first input terminal connected to the row input terminal, and a second input terminal provided as a discharge control terminal; and a third multiplexer having an output terminal connected to gates of the current output transistor and the auto-clamped pre-charge transistor, a first input terminal connected to ground, and a second input terminal connected to a bias output terminal, wherein each of the first, the second, and the third multiplexers has a control terminal connected together for being provided as a programmable control terminal.

Other objects, advantages, and novel features of the invention will become more apparent from the detailed description when taken in conjunction with the accompanying drawings.

DETAILED DESCRIPTION OF THE PREFERRED EMBODIMENT

Figure 1:
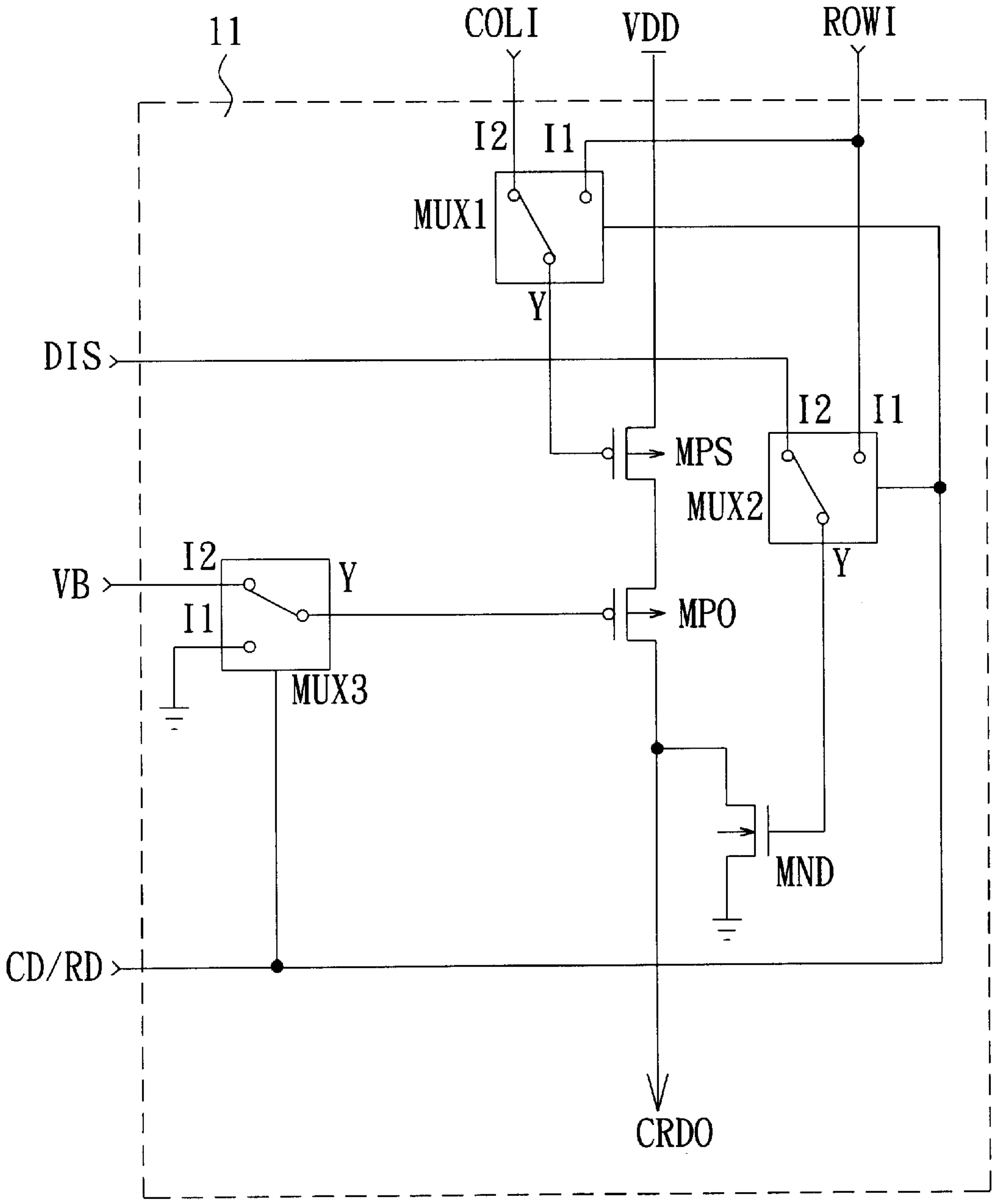
FIG. 1 shows a driver cell of the programmable driving circuit in accordance with a first preferred embodiment of the present invention.

FIG. 1 shows a driver cell 11 of the programmable driving circuit in accordance with a preferred embodiment of the present invention. The driver cell 11 comprises a PMOS transistor MPS used as a switch device and a PMOS transistor MPO used as current output device. The source of transistor MPS is connected to the supplied voltage VDD, the drain thereof is connected to the source of transistor MPO, and the gate thereof is connected to the output terminal Y of multiplexer MUX1. The first input terminal I1 and second input terminal I2 of multiplexer MUX1 are connected to row input terminal ROWI and column input terminal COLI, respectively. The drain of transistor MPO is connected to column/row output terminal CRDO and the gate thereof is connected to output terminal Y of multiplexer MUX3. The first input terminal I1 and second input terminal I2 of multiplexer MUX3 are connected to ground and the bias output terminal VB of a reference bias generator (not shown), respectively.

The driver cell 11 further comprises an NMOS transistor MND used as a discharge device, which has a drain connected to the drain of transistor MPO, a source connected to ground, and a gate connected to output terminal Y of multiplexer MUX2. The first input terminal I1 and second input terminal I2 of multiplexer MUX2 are connected to row input terminal ROWI and discharge control terminal DIS, respectively.

With the driver cells 11 in the driving circuit, if input signal of control terminal CD/RD for controlling each of multiplexers MUX1~MUX3 is set to logic one, output terminal Y of each of multiplexers MUX1~MUX3 is switched to connect with the second input terminal I2. Therefore, when column input terminal COLI is low, PMOS transistor MPS is turned on to output a constant voltage from column/row output terminal CRDO. When the discharge control terminal DIS is high, transistor MM) is turned on to discharge. As a result, the driver cell 11 functions as a column driver cell.

On the contrary, if the input signal of control terminal CD/RD is set as logic zero, output terminal Y of each of multiplexers MUX1~MUX3 is switched to connect with first input terminal I1. As such, the gate of transistor MPS is switched to connect with row input terminal ROWI through multiplexer MUX1 1. The gate of transistor MND is switched to connect with row input terminal ROWI through multiplexer MUX2. The gate of transistor MPO is switched to connect with ground through multiplexer MUX3, so that transistor MPO is forced to be turned on and behaves as a small resistor. Furthermore, because the gates of transistors MPS and MND are coupled together and further connected to row input terminal ROWI, driver cell 11 functions as an inverter controlled by row input terminal ROWI; i.e., functions as a row driver cell.

Figure 2:
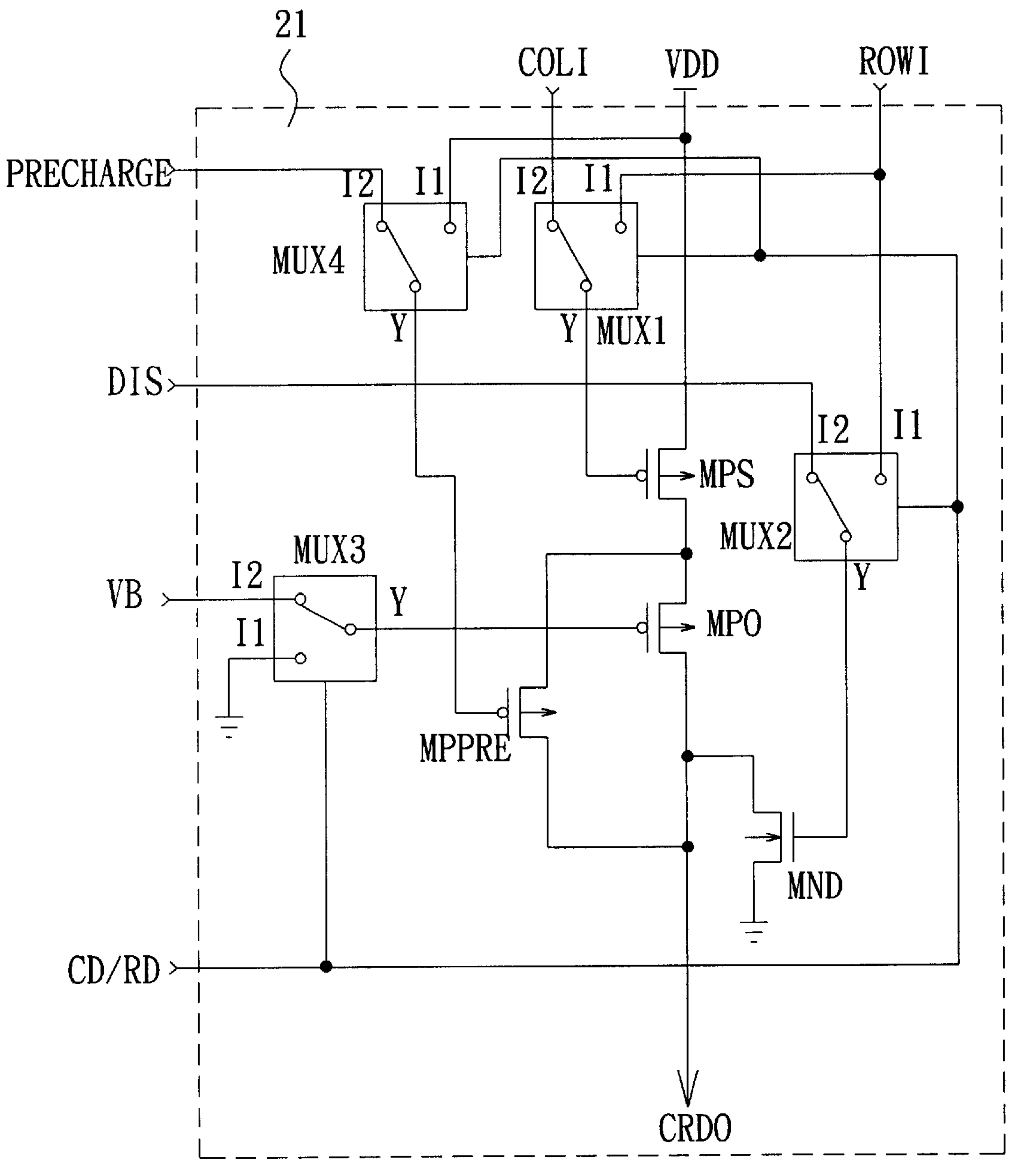
FIG. 2 shows a driver cell of the programmable driving circuit in accordance with a second preferred embodiment of the present invention.

With reference to FIG. 2, there is shown a driver cell 21 of the programmable driving circuit in accordance with a second preferred embodiment of the present invention. Similar to the previous embodiment, the driver cell 21 also comprises a PMOS transistor MPS used as a switch device, a PMOS transistor MPO used as a current output device, an NMOS transistor MND used as a discharge device, and multiplexers MUX1~MUX3. This embodiment is different from the previous one in that a PMOS transistor MPPRE is provided as a pre-charge device, which is connected to transistor MPO in parallel. That is, the source and drain of transistor MPPRE are connected to the source and drain of transistor MPO, respectively, and the gate thereof is connected to output terminal Y of multiplexer MUX4. The first input terminal I1 and second input terminal I2 of multiplexer MUX4 are connected to the supplied voltage VDD and pre-charge control terminal PRECHARGE, respectively.

With the driver cells 21 of the driving circuit, if input signal of control terminal CD/RD for controlling each of multiplexers MUX1~MUX4 is set to logic one, output terminal Y of each of multiplexers MUX1~MUX4 is switched to connect with second input terminal 12. Same as the first embodiment, driver cell 21 also functions as a column driver cell. The gate of transistor MPPRE is connected to pre-charge control terminal PRECHARGE, and thus, the gate of transistor MPPRE can be grounded for a short period of time at the beginning of a driving period, so as to produce an abrupt large current for rapidly charging the stray capacitor to a high voltage thereby achieving a pre-charge effect.

On the contrary, if the input signal of control terminal CD/RD is set to be logic zero, output terminal Y of each of multiplexers MUX1~MUX4 is switched to connect with first input terminal I1. As such, the gate of transistor MPPRE is connected to the supplied voltage VDD, so that transistor MPPRE is kept in an off state without producing any effect. Therefore, same as the first embodiment, the driver cell 21 also functions as a row driver cell.

Figure 3:
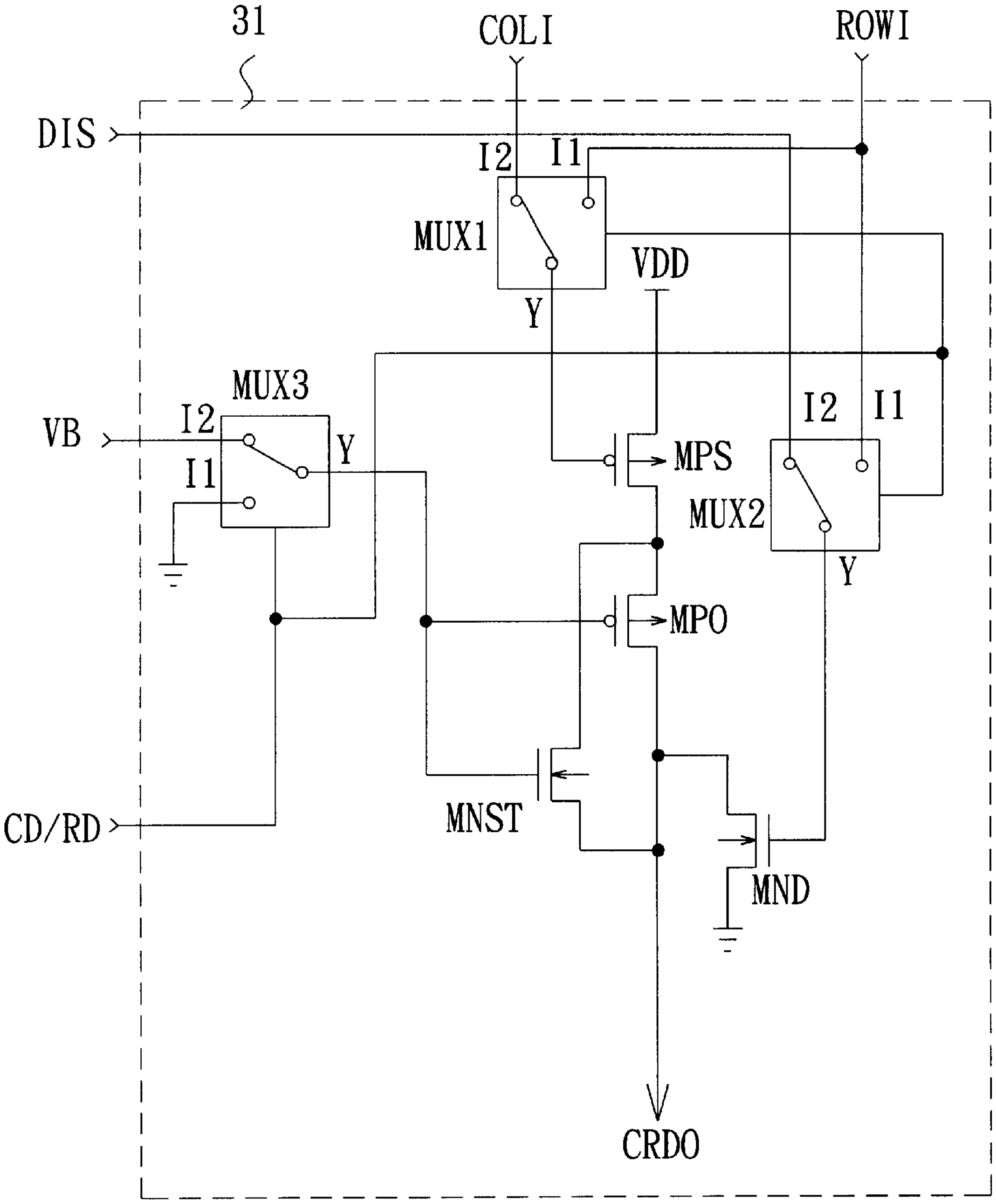
FIG. 3 shows a driver cell of the programmable driving circuit in accordance with a third preferred embodiment of the present invention.

With reference to FIG. 3, there is shown a driver cell 31 of the programmable driving circuit in accordance with a third preferred embodiment of the present invention. Similar to the first embodiment, the driver cell 31 also comprises a PMOS transistor MPS used as a switch device, a PMOS transistor MPO used as a current output device, an NMOS transistor MND used as a discharge device, and multiplexers MUX1~MUX3. This embodiment is different from the first one in that a NMOS transistor MNST used as an auto-clamped pre-charged device is provided, which is connected to current output transistor MPO in parallel to form a source follower. That is, the source and drain of transistor MNST are connected to the source and drain of transistor MPO respectively, and the gate thereof is connected to the gate of transistor MPO and further connected to output terminal Y of multiplexer MUX3.

With the driver cells 31 of the driving circuit, if input signal of control terminal CD/RD for controlling each of multiplexers MUX1~MUX3 is set to logic one, output terminal Y of each of multiplexers MUX1~MUX3 is switched to connect to second input terminal 12. Same as the first embodiment, the driver cell 31 also functions as a column driver cell. Furthermore, the gate of transistor MNST is connected to the bias output terminal VB. Hence, when transistor MPO starts to output a constant current, the voltage of the OLED to be driven is still 0V, a low voltage, or even a negative voltage. Because the gate to source voltage $V_{GS}$ of transistor MNST is equal to the voltage of bias output terminal VB minus the voltage of OLED, $V_{GS}$ is greater than threshold voltage Vth of transistor MNST, and thus, pre-charge device MNST will be turned on and its drain to source current $I_{DS}$ is provided as an additional large current for rapidly pre-charging the OLED to be driven. Accordingly, the voltage of OLED is rapidly charged until $V_{GS}$ is smaller than Vth, thereby achieving an auto-clamped pre-charging.

On the contrary, if the input signal of control terminal CD/RD is set to be zero, output terminal Y of each of multiplexers MUX1~MUX3 is switched to connect first input terminal I1. As such, the gate of transistor MNST is switched to connected with the supplied voltage VDD, and thus kept in an off state without producing any effect. Same as the previous embodiment, the driver cell 31 also functions as a row driver cell.

Figure 4:
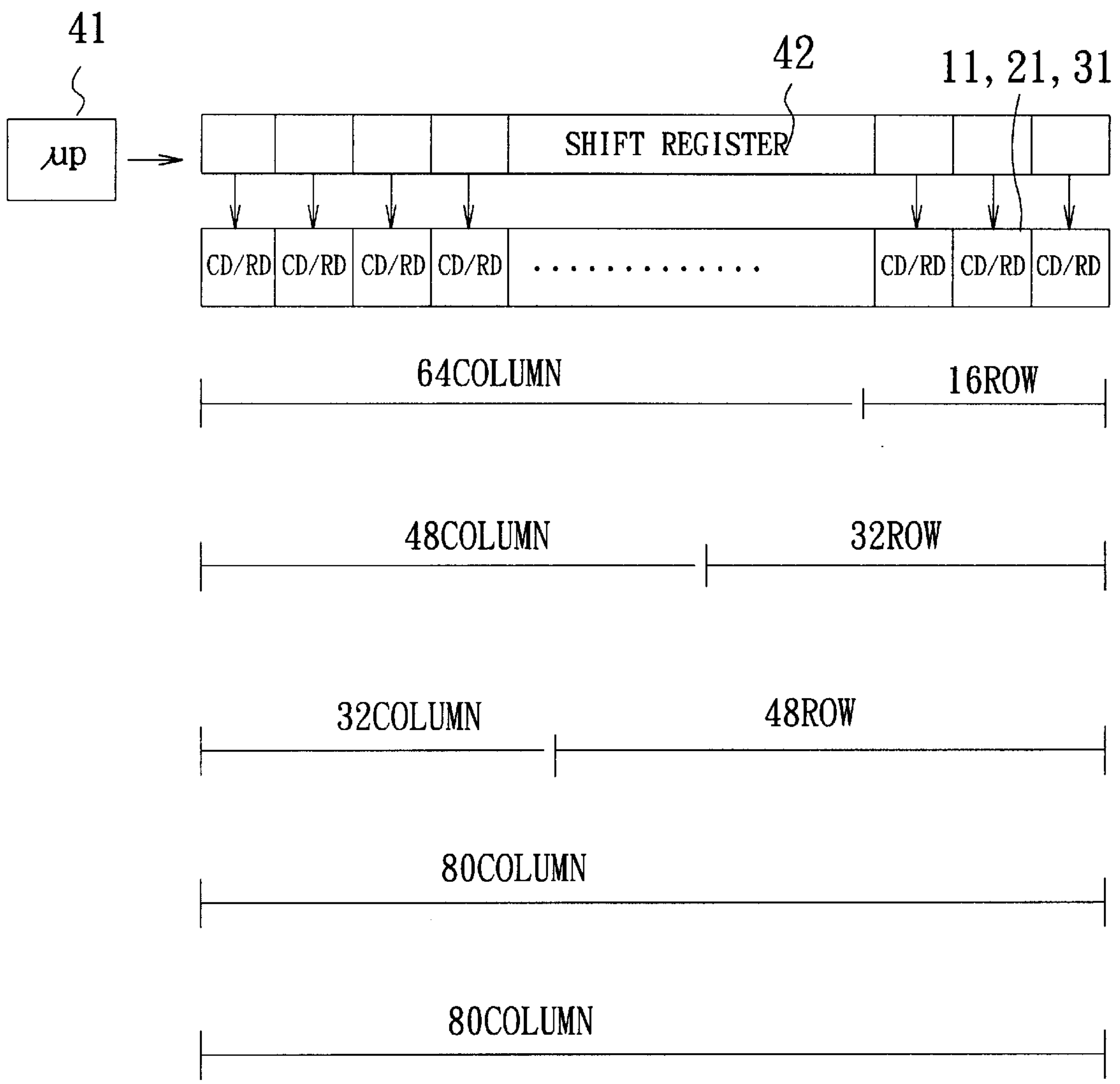
FIG. 4 schematically illustrates a programmable driving circuit in accordance with the present invention for being programmed.
Figure 5:
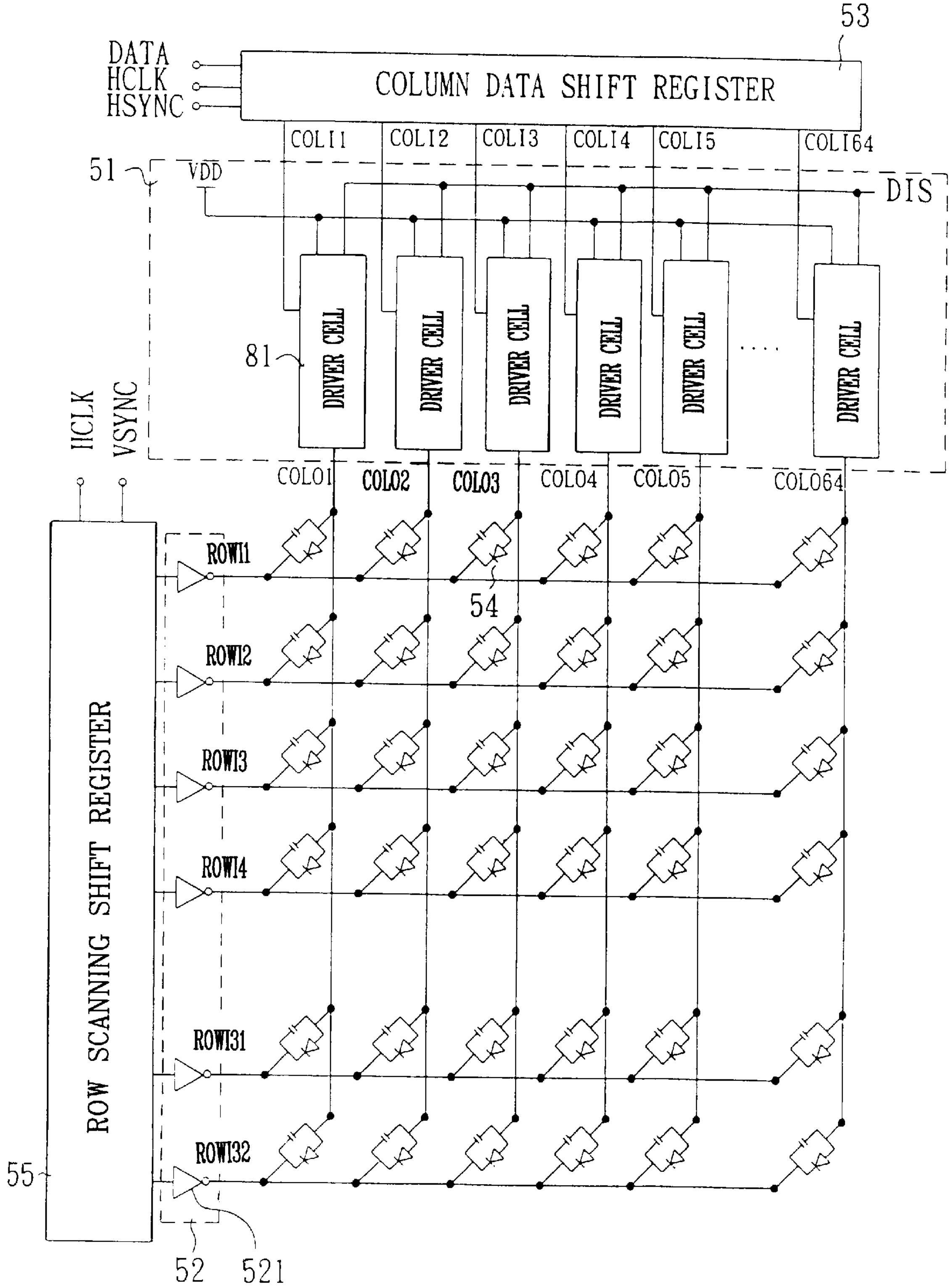
FIG. 5 PRIOR ART
FIG. 5 illustrates the system architecture of an OLED panel driven by a constant voltage driving circuit in prior art.
Figure 6:
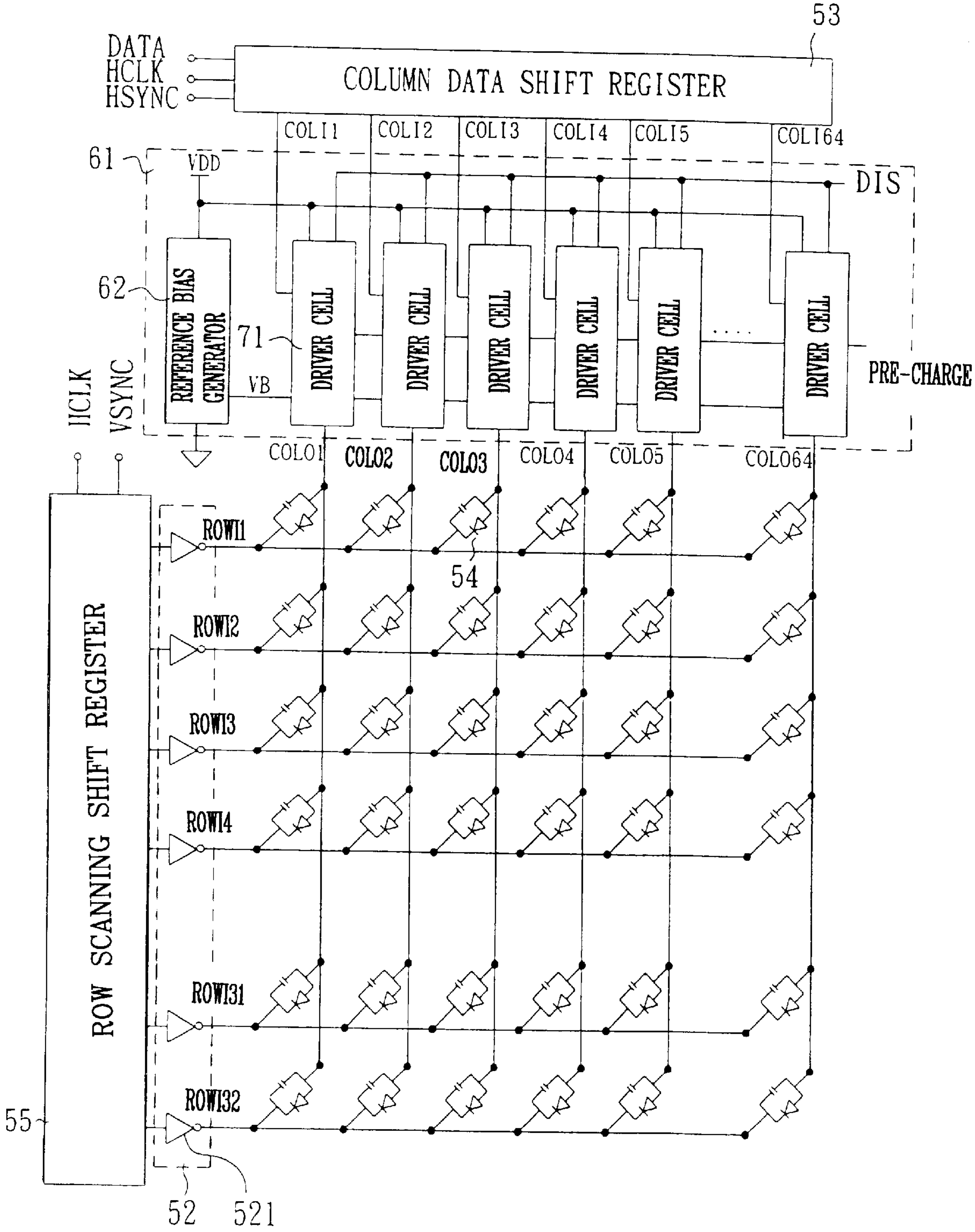
FIG. 6 PRIOR ART
FIG. 6 illustrates the system architecture of an OLED panels driven by a constant current driving circuit in prior are.
Figure 7:
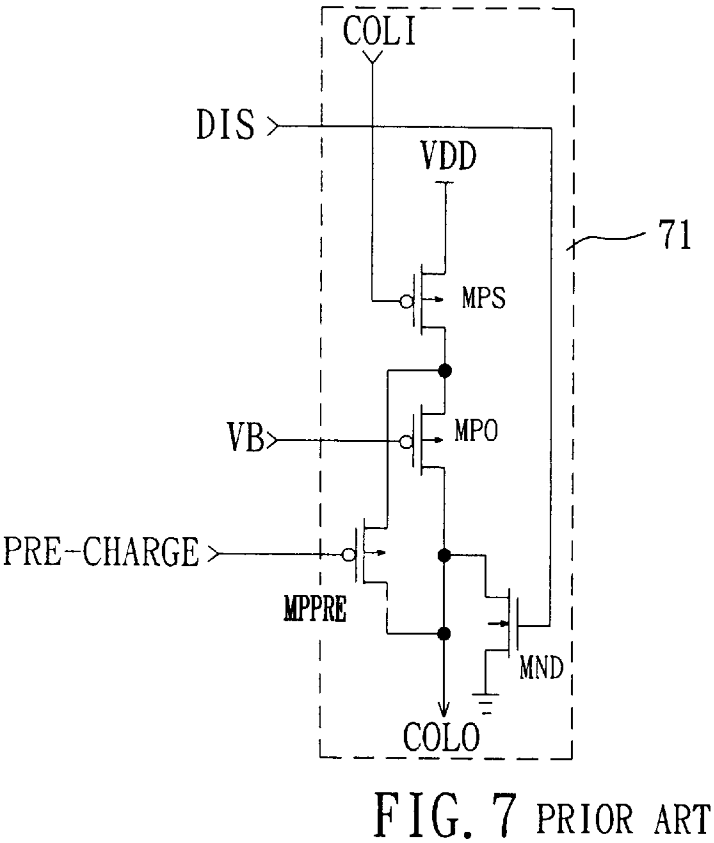
FIG. 7 PRIOR ART
FIG. 7 is the circuit diagram of a constant current column driver cell.
Figure 8:
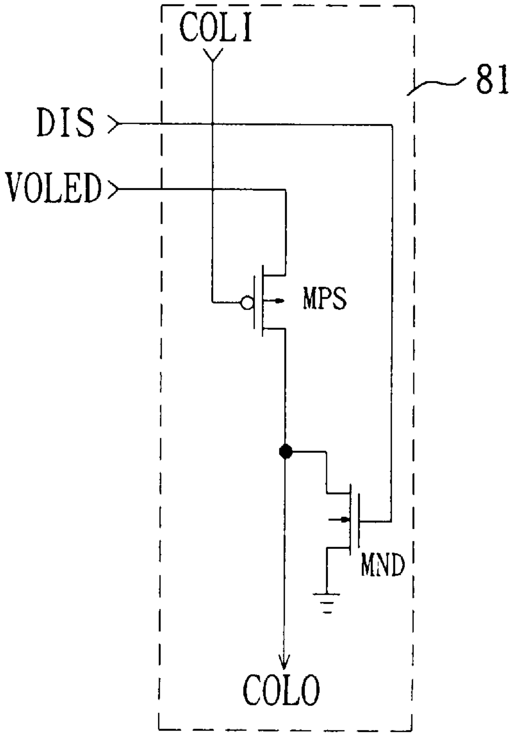
FIG. 8 PRIOR ART
FIG. 8 is the circuit diagram of a constant voltage column driver cell.

FIG. 4 schematically illustrates the present programmable driving circuit to be programmed, wherein the driving circuit is composed by a plurality of driver cells arranged sequentially, each being the driver cell 11, 21 or 31 as described in the aforementioned embodiments. The input to the control terminal CD/RD of each driver cell 11, 21 or 31 is determined by a program. For example, control data is written into a shift register 42 by microprocessor 41 for determining the input to each driver cell 11, 21 or 31. Hence, by utilizing the programmable driving circuit of the invention to design the OLED driver IC, it is applicable to program a required number of column driver cells and row driver cells based on the combination of pixels of the OLED panel. For example, a driving circuit having 80 driver cells can be programmed to be a driver IC with 64 column driver cells plus 16 row driver cells, 48 column driver cells plus 32 row driver cells, 32 column driver cells plus 48 row driver cells, 16 column driver cells plus 64 row driver cells, or simply 80 column driver cells, or 80 row driver cells for being applied to a large OLED display panel. Consequently, there is no need to design and fabricate column driver ICs and row driver ICs separately as experienced by the prior art. Instead, a single OLED driver IC can be used to fulfill the needs of various OLED display panels, thereby greatly reducing the manufacturing cost and saving the resource.

Although the present invention has been explained in relation to its preferred embodiment, it is to be understood that many other possible modifications and variations can be made without departing from the spirit and scope of the invention as hereinafter claimed.

What is claimed is:

1. A programmable driving circuit having a plurality of driver cells, each comprising:

- a switch transistor having a source connected to a supplied voltage;
- a current output transistor having a source connected to a drain of the switch transistor, and a drain provided as a column/row output terminal of the driver cell;
- a discharge transistor having a drain connected to the drain of the current output transistor, and a source connected to ground;
- a first multiplexer having an output terminal connected to the gate of the switch transistor, a first input terminal and a second input terminal provided as a row input terminal and a column input terminal of the driver cell, respectively;
- a second multiplexer having an output terminal connected to the gate of the discharge transistor, a first input terminal connected to the row input terminal, and a second input terminal provided as a discharge control terminal; and
- a third multiplexer having an output terminal connected to the gate of the current output transistor, a first input terminal connected to ground, and a second input terminal connected to a bias output terminal, wherein each of the first, the second, and the third multiplexers has a control terminal connected together for being provided as a programmable control terminal.

2. The programmable driving circuit as claimed in claim 1, wherein the switch transistor and the current output transistor are PMOS transistors and the discharge transistor is an NMOS transistor.

3. The programmable driving circuit as claimed in claim 2, wherein, when the programmable control terminal is set to be logic one, the output terminal of each multiplexer is switched to connect with the second input terminal, so that the driver cell functions as a column driver cell.

4. The programmable driving circuit as claimed in claim 2, wherein, when the programmable control terminal is set to be logic zero, the output terminal of each multiplexer is switched to connect with the first input terminal, so that the driver cell functions as a row driver cell.

5. A programmable driving circuit having a plurality of driver cells, each comprising:

a switch transistor having a source connected to a supplied voltage;

a current output transistor having a source connected to a drain of the switch transistor, and a drain provided as a column/row output terminal of the driver cell;

a discharge transistor having a drain connected to the drain of the current output transistor, and a source connected to ground;

a pre-charge transistor having a source and a drain connected to the source and the drain of the current output transistor, respectively;

a first multiplexer having an output terminal connected to a gate of the switch transistor, a first input terminal and a second input terminal provided as a row input terminal and a column input terminal of the driver cell, respectively;

a second multiplexer having an output terminal connected to a gate of the discharge transistor, a first input terminal connected to the row input terminal, and a second input terminal provided as a discharge control terminal;

a third multiplexer having an output terminal connected to a gate of the current output transistor, a first input terminal connected to ground, and a second input terminal connected to a bias output terminal; and a fourth multiplexer having an output terminal connected to a gate of the pre-charge transistor, a first input terminal connected to the supplied voltage, and a second input terminal provided as a discharge control terminal, wherein each of the first, the second, the third, and the fourth multiplexers has a control terminal connected together for being provided as a programmable control terminal.

6. The programmable driving circuit as claimed in claim 5, wherein the switch transistor, the current output transistor, and the pre-charge transistor are PMOS transistors and the discharge transistor is an NMOS transistor.

7. The programmable driving circuit as claimed in claim 6, wherein, when the programmable control terminal is set to be logic one, the output terminal of each multiplexer is switched to connected with the second input terminal, so that the driver cell functions as a column driver cell.

8. The programmable driving circuit as claimed in claim 7, wherein, when the programmable control terminal is set to be logic zero, the output terminal of each multiplexer is switched to connect with the first input terminal, so that the driver cell functions as a row driver cell.

9. A programmable driving circuit having a plurality of driver cells, each comprising:

a switch transistor having a source connected to a supplied voltage;

a current output transistor having a source connected to a drain of the switch transistor, and a drain provided as a column/row output terminal of the driver cell;

a discharge transistor having a drain connected to the drain of the current output transistor and a source connected to ground;

an auto-clamped pre-charge transistor having a source and a drain connected to the source and the drain of the current output transistor, respectively;

a first multiplexer having an output terminal connected to a gate of the switch transistor, a first input terminal and a second input terminal provided as a row input terminal and a column input terminal of the driver cell, respectively;

a second multiplexer having an output terminal connected to a gate of the discharge transistor, a first input terminal connected to the row input terminal, and a second input terminal provided as a discharge control terminal; and a third multiplexer having an output terminal connected to gates of the current output transistor and the auto-clamped pre-charge transistor, a first input terminal connected to ground, and a second input terminal connected to a bias output terminal, wherein each of the first, the second, and the third multiplexers has a control terminal connected together for being provided as a programmable control terminal.

10. The programmable driving circuit as claimed in claim 9, wherein the switch transistor and the current output transistor are PMOS transistors and the discharge transistor and the auto-clamped pre-charge transistor are NMOS transistors.

11. The programmable driving circuit as claimed in claim 10, wherein, when the programmable control terminal is set to be logic one, the output terminal of each multiplexer is switched to connect with the second input terminal, so that the driver cell functions as a column driver cell.

12. The programmable driving circuit as claimed in claim 10, wherein, when the programmable control terminal is set to be logic zero, the output terminal of each multiplexer is switched to connect with the first input terminal, so that the driver cell functions as a row driver cell.

* * * * *